United States Patent [19]

Josereau

[11] Patent Number: 4,840,260
[45] Date of Patent: Jun. 20, 1989

[54] BICYCLE FREE-WHEEL STARWHEEL AND FREE WHEEL PROVIDED WITH SUCH A STARWHEEL

[75] Inventor: Bernard Josereau, Eu, France

[73] Assignee: Establissements Maurice Maillard, Incheville, France

[21] Appl. No.: 81,061

[22] Filed: Aug. 3, 1987

[30] Foreign Application Priority Data

Aug. 5, 1986 [FR] France .................. 86 11325

[51] Int. Cl.⁴ .............................. F16D 41/30
[52] U.S. Cl. ................................................ 192/64
[58] Field of Search ............... 192/64, 46; 301/105 B

[56] References Cited

U.S. PATENT DOCUMENTS

| | | | |
|---|---|---|---|
| 709,900 | 9/1902 | Gurney et al. | 192/46 |
| 3,166,171 | 1/1965 | Schwerdhofer et al. | 192/64 |
| 3,554,340 | 1/1971 | Shimano et al. | 192/64 |
| 4,324,323 | 4/1982 | Campagnolo | 192/64 |
| 4,328,882 | 5/1982 | Isobe | 192/64 |
| 4,353,447 | 10/1982 | Bes | 192/64 |
| 4,363,390 | 12/1982 | Eisend et al. | 192/64 X |
| 4,580,670 | 4/1986 | Nagano | 192/64 |
| 4,702,486 | 10/1987 | Tsuchie | 192/64 X |
| 4,727,965 | 3/1988 | Zach et al. | 192/46 X |

*Primary Examiner*—Rodney H. Bonck
*Attorney, Agent, or Firm*—Sughrue, Mion, Zinn, Macpeak, and Seas

[57] ABSTRACT

A bicycle free-wheel starwheel has receptacles 3, 4 for spring pawls 5 which interlock the starwheel 1, in one direction of rotation, with an outer ring 21 of a sprocket wheel within which the starwheel is rotatably mounted. The starwheel consists of at least one stamped piece, and the receptacles for the spring pawls are mounted on or stamped integrally with the starwheel.

16 Claims, 2 Drawing Sheets

BICYCLE FREE-WHEEL STARWHEEL AND FREE WHEEL PROVIDED WITH SUCH A STARWHEEL

The present invention relates to a bicycle free wheel, whether having a single toothing or multiple toothings.

Such free wheels are known which possess at least:

one ring, toothed or otherwise, possessing one or more sprockets mounted and fixed on the ring by keying or threading. Such a ring possesses ratchet splines in its part closest to the hub of a bicycle wheel, and two ball races in its lateral parts;

an inner starwheel intended to be fixed to the hub of the bicycle wheel by an interior thread, or a system of helical grooves, possessing on its outer circumference one or more cavities intended to receive one or more pawls and an equivalent quantity of springs. These pawls clamp interlock the starwheel and the ring in one direction of rotation and free them in the other direction of rotation. Furthermore, a ball race is present on one of the sides of the starwheel, and on one other side there is present a threaded outer seating intended to receive a web or lid by screwing. In the central part of the starwheel are provided splines for mounting the freewheel on the hub of the bicycle wheel and removing it therefrom;

a web or lid on which is provided an interior thread for interacting with the exterior thread of the starwheel. This web likewise possesses a ball race; and a double row of balls.

According to another form of embodiment, the inner starwheel possesses one or more cavities intended to receive one or more pawls and a circular retaining groove intended to receive a single common spring ring for restoring all the pawls.

In such embodiments the starwheel has the disadvantage of being a component of substantial thickness, greater than that of the pawls, in which the cavities for the pawls, the splines for mounting and removal on the hub, the thread, and the optional retaining groove for a single ring forming a restoring spring for the pawls, all have to be produced either by machining operations or by successive operations of extrusion, forging and machining, these operations causing the retain price of the piece in question to be relatively high.

To remedy these disadvantages, the object of the invention is to produce a free wheel which is less thick than the pawls and simpler to produce.

For this purpose, the invention relates to a bicycle free-wheel starwheel possessing receiving means for spring pawls for interlocking the starwheel, in one direction of rotation, with an outer ring of the free wheel of which the starwheel is intended to form part, characterized in that the receiving means for the spring pawls are mounted on the starwheel or stamped integrally therewith.

The invention will be better understood by reading the description which follows and is given with reference to the attached drawings, provided purely by way of example, in which.

Figure 1:
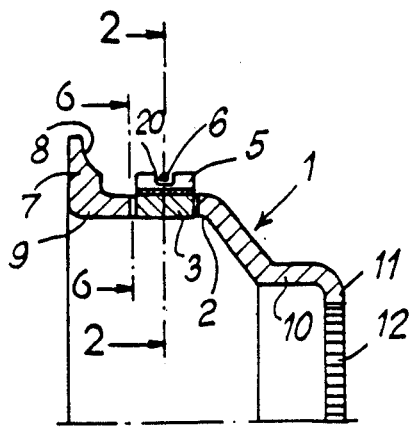
FIG. 1 is a half-view in section of a starwheel according to the invention.

The reference numeral 1 in FIG. 1 shows a bicycle free-wheel starwheel according to the invention formed by a stamped piece possessing rectangular slots 2 each receiving a cradle 3 provided with a seating 4 for receiving a pawl 5 retained laterally in its seating 4 by a circular spring ring 6 which is common to all the pawls.

The starwheel 1 possesses, in succession away from one of its faces, a flange 7 which is integrally stamped and is provided with a ball race 8 intended to interact with a first row of balls, a first tubular part 9 in which are cut out slots 2 regularly distributed over its periphery, a furstoconical connecting part between this first tubular part and a second tubular part 10, of lesser diameter, and lastly a recessed shoulder 11 in which are cut out splines 12 for mounting on the hub of a bicycle wheel (not shown) and removal therefrom.

Figure 2:
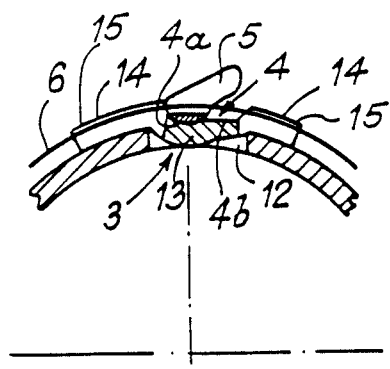
FIG. 2 is a partial view in section along the line 2—2 in FIG. 1, showing the retaining means for a pawl.
Figure 3:
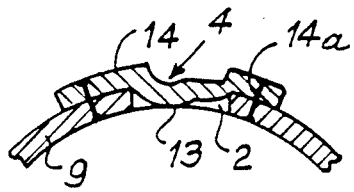
FIG. 3 is a view in section, similar to FIG. 2, of another method of securing the retaining means for a pawl.
Figure 4:
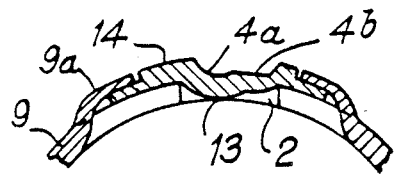
FIG. 4 is a partial view in section of another form of the securing shown in FIG. 3.
Figure 5:
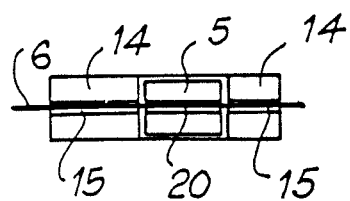
FIG. 5 is a view from above of the cradle pawl ring assembly.

Each seating 4 possesses a concave part 4a interacting with a correspondingly shaped part of the pawl 5 and thus permitting the latter to rotate about the axis of the concave part of the cavity, and a flat part 4b for receiving the pawl 5 in a retracted position. Each cradle further possesses a protrusion 13, obtained in the course of the production of the seating 4 and intended to position the cradle 3 adequately in the corresponding slot 2 of the starwheel 1, and two end portions 14 each possessing a groove 15 ensuring the lateral retention of the circular spring ring 6. The end portions 14 are in contact with the outer surface of the first tubular part 9 of the starwheel and are fixed thereto by bonding, welding, riveting or crimping. These different methods of fixing the cradles are shown in FIGS. 2, 3 and 4. Thus in FIG. 3 it can be seen that the end portions 14 of the cradles are assembled with the tubular part 9 of the starwheel by rivets 14a. Similarly in FIG. 4 it can be seen that the tubular part 9 possesses lugs 9a fixing the thinner parts of the end portions 14 by crimping.

Figure 6:
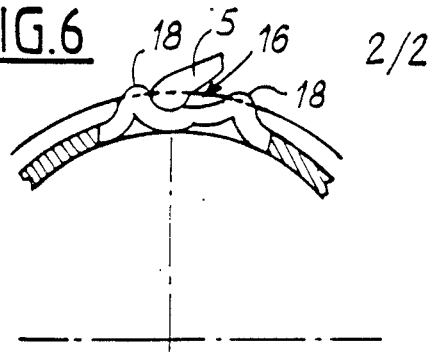
FIG. 6 is a partial view in section similar to FIG. 2 showing another form of embodiment of the retaining means for a pawl.
Figure 7:
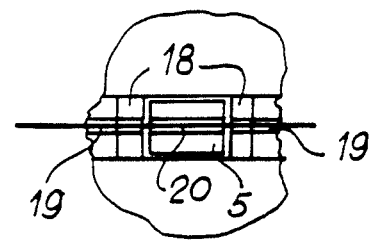
FIG. 7 is a view from above corresponding to FIG. 6.

In another embodiment of the invention shown in FIG. 6, the retaining means for the pawls and of the circular spring ring are obtained in a single piece from the first tubular part 9 of the starwheel. The seating 16 for pawls, identical to the seatings 4 of the cradles 3 described above, are obtained by semi-recessed cutting and shaping. In the course of this shaping, two rectangular bosses 18 are also formed, in which are cut two grooves 19 giving lateral support to the circular spring ring 6 (FIG. 7).

In the two embodiments described above, once the starwheel has been produced the pawls 5 are placed in their respective seatings and the circular spring ring 6 is positioned either in the grooves 15 of the cradles 3

(FIG. 2) or in the grooves 19 (FIG. 6), and in a channel 20 provided in the pawl 5. Thus positioned, the spring bears on the bottom of the channel 20 in the pawls, constantly restoring these towards a projecting position.

Figure 8:
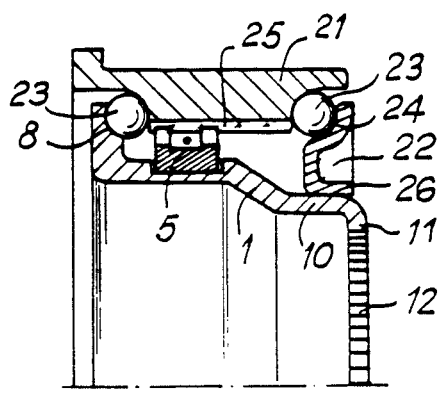
FIG. 8 is a diagrammatic half-view in section of a free wheel provided with a starwheel according to the invention.

FIG. 8 shows a starwheel-ring assembly according to the invention comprising a starwheel 1, an outer ring 21 and a web 22.

The outer ring 21, intended to receive on its external surface several toothed sprockets (not shown), is mounted to rotate about the axis of the starwheel by means of two rows of balls 23 accommodated between the outer ring 21 and the ball race 8 of the starwheel 1 on the one hand and a ball race 24 provided on the web 22 on the other hand. Moreover this outer ring 21 is provided on its inner surface with ratchets 25 provided to interact with the pawls 5 when the latter project out of their seatings.

Figure 9:
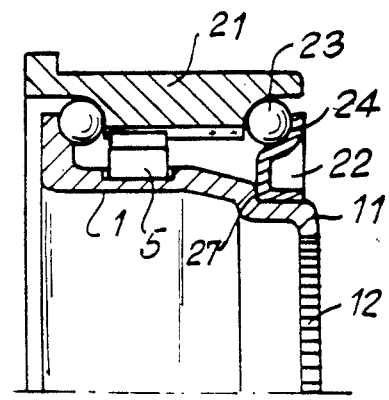
FIG. 9 is a half-view similar to that of FIG. 8, showing an alternative embodiment of the starwheel according to the invention.

The web 22, obtained by stamping, possesses a tubular part 26 making it possible to obtain rigid shrink-fitting of the web 22 onto the second tubular part 10 of the starwheel 1. The web 22 is immobilized in a position ensuring satisfactory operation, by welding, bonding or crimping. In an alternative embodiment shown in FIG. 9, the position of the web 22 ensuring satisfactory operation is predetermined by a shoulder 27 provided on the starwheel 1.

Figure 10:
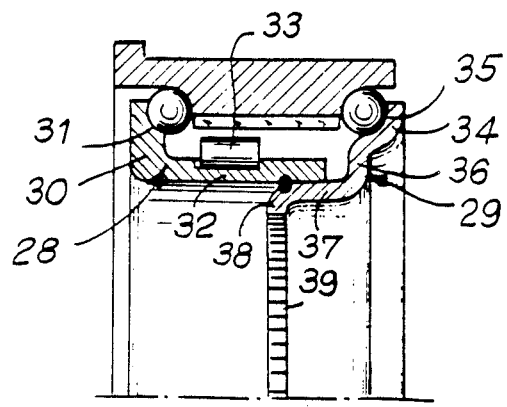
FIG. 10 is a half-view similar to FIGS. 8 and 9, showing another form of embodiment of the starwheel according to the invention.

In another alternative embodiment of the invention shown in FIG. 10 the starwheel is produced in two stamped pieces 28, 29; the first piece 28 possesses a flange 30 provided with a ball race 31 for a first row of balls and a cylindrical part 32 whose outer face possesses means 33 for retaining spring pawls, identical for example to those described with reference to FIG. 6.

The inner face of the tubular part 32 receives, by rigid shrink-fitting, the second piece 29 which is immobilized in the first piece by bonding, welding or crimping. This second piece 29 possesses, on the side opposed to the flange 30 of the first piece 28, a flange 34 provided with a ball race 35 for a second row of balls, an annular flank 36, a tubular part 37 whose external diameter is intended to enable a rigid shrink fit to be obtained between the tubular part 32 of the first piece 28 on the one hand and the tubular part 37 of the second piece 29 on the other hand, and finally a recessed rim 38 in which are provided splines 39 for mounting the assembly on the hub of a bicycle wheel and removing it therefrom.

A bicycle free wheel is thus produced which has a starwheel of slight thickness, of a weight which is distinctly lighter than conventional starwheels and requiring no machining, which considerably reduces the manufacturing costs.

What is claimed is:

1. A bicycle free-wheel starwheel assembly, comprising:
    (a) a starwheel (1) constituted by at least one thin, stamped member,
    (b) a plurality of spaced, recessed receptacles (3,4) disposed around an outer periphery of the starwheel, and individually mounted thereon,
    (c) a plurality of spring biased pawls (5) individually pivotally disposed in the receptacle recesses for interlocking the starwheel, in one direction of rotation, with an outer ring (21) of a sprocket wheel within which the starwheel is rotatably journaled.

2. A starwheel assembly according to claim 1, wherein the starwheel has a plurality of slots (2) distributed over the periphery of a tubular part (9) thereof, the receptacles for the pawls being defined by cradles (3) of stamped sheet metal engaged in the slots by an integrally stamped protrusion (13) and fixed to the starwheel by welding, riveting or crimping.

3. A starwheel assembly according to claim 2, wherein the cradles each define a concave part (4a) and a flat part (4b) for receiving an associated pawl in a retracted position, the concave part and the flat part being integrally stamped.

4. A starwheel assembly according to claims 2 or 3, wherein each cradle has end portions (14) fixed to the tubular part of the starwheel by welding, riveting or crimping.

5. A starwheel assembly according to claim 4, wherein the end portions are provided with a groove (15) receiving a circular spring ring (6) for biasing the pawls outwardly.

6. A bicycle free-wheel starwheel assembly, comprising:
    (a) a starwheel (1) constituted by at least one thin, stamped member,
    (b) a plurality of spaced, recessed receptacles (3,4) which are disposed around an outer periphery of the starwheel, which are integral with said starwheel, and which are local plastic deformations of portions of said thin member throughout the entire thickness thereof, and
    (c) a plurality of spring biased pawls (5) individually pivotally disposed in the receptacle recesses for interlocking the starwheel, in one direction of rotation, with an outer ring (21) of a sprocket wheel within which the starwheel is rotatably journaled.

7. A starwheel assembly according to claim 6, wherein the receptacles for the pawls are integral cradles in the form of cut-outs and stampings in corresponding regions of a tubular part of the starwheel.

8. A starwheel assembly according to claim 7, wherein the cradles each define a seating (16) for a pawl comprising a concave part and a flat part, and two rectangular bosses (18) in which are cut out notches (19) receiving a circular spring ring (6) for biasing the pawls outwardly.

9. A starwheel assembly according to claims 1 or 6, wherein the starwheel is associated with another stamped member defining a web (22), and having a ball race (24) for a corresponding row of balls.

10. A starwheel assembly according to claim 9, wherein said another stamped member is rigidly shrink-fitted onto the starwheel, and immobilized thereon by a bond, weld or crimp.

11. A starwheel assembly according to claim 10, wherein said another stamped member is disposed on the outer surface of a tubular part of the starwheel axially displaced from the receptacles.

12. A starwheel assembly according to claim 11, wherein the starwheel has a shoulder (27) on the tubular part against which said another stamped member is supported.

13. A starwheel assembly according to claim 10, wherein said another stamped member (29) is rigidly shrink-fitted to an inner surface of a tubular part (32) of the starwheel.

14. A starwheel assembly according to claim 9, wherein the starwheel has splines (12) for removable mounting on the hub of a bicycle wheel.

15. A starwheel assembly according to claim 14, wherein the splines are disposed in a recessed rim of said one stamped member.

16. A starwheel assembly according to claim 14, wherein the splines (39) are disposed in a recessed rim (38) of said another stamped member (29).

* * * * *